United States Patent

[11] 3,540,746

| [72] | Inventors | Robert E. Jepsen<br>Emmaus;<br>Richard E. Luybli, Hellertown; Harold R.<br>Sell, Trumbauersville, Pennsylvania |
|---|---|---|
| [21] | Appl. No. | 722,265 |
| [22] | Filed | April 18, 1968 |
| [45] | Patented | Nov. 17, 1970 |
| [73] | Assignee | Air Products and Chemicals, Inc.<br>Allentown, Pennsylvania<br>a corporation of Delaware |

[54] COMBINED SPLIT AND SEGMENTAL PISTON RINGS
12 Claims, 5 Drawing Figs.

[52] U.S. Cl. .................................................. 277/193,
277/199
[51] Int. Cl. ......................................................... F16j 15/00,
F16j 9/16
[50] Field of Search ............................................ 277/193,
70, 71, 199, 198, 195, 192, 165, 231, 154

[56] References Cited
UNITED STATES PATENTS

| 2,852,324 | 9/1958 | Marien | 277/165X |
|---|---|---|---|
| 2,927,831 | 3/1960 | Tuczek | 277/198X |
| 3,235,274 | 2/1966 | Cain et al. | 277/156X |
| 3,373,999 | 3/1968 | Jepsen | 277/193 |

Primary Examiner—Samuel Rothberg
Attorneys—Ronald B. Sherer and B. Max Klevit

ABSTRACT: A plurality of fluid-sealing piston rings is disclosed including a top ring of split configuration composed of relatively soft, resilient material and at least one lower ring having individual segments composed of a much harder, non-resilient material. The segments are set into a resilient carrier ring which is composed of elastomeric material. Fluid passages admit pressurized fluid behind the radially inner ring surfaces and expand both the top and lower rings into effective sealing engagement with the cylinder wall whereby the combined rings provide substantially improved sealing and wear-life properties.

Patented Nov. 17, 1970

3,540,746

FLUID PRESSURE ON RINGS

NET FLUID PRESSURE ON RINGS

INVENTORS
BY ROBERT E. JEPSEN
RICHARD E. LUYBLI
HAROLD R. SELL

COMBINED SPLIT AND SEGMENTAL PISTON RINGS

BACKGROUND OF THE INVENTION

As disclosed in FIGS. 1 and 2, extensive tests of the factors causing wear of piston rings have indicated that, in a multiple-ring system, there is a substantially decreasing fluid pressure gradient between the wall of the cylinder and the rings as the distance away from working chamber increases. At the same time, the pressure of the fluid admitted from the working chamber to the radially inner surfaces of the rings remains substantially constant behind each of the rings. Thus, as shown in FIG. 2, there is a net fluid pressure gradient acting on the radially inner surfaces of the rings such that the lowermost ring in the two-ring system is forced into much greater sealing engagement with the cylinder wall than is the upper ring. Accordingly, the amount of wear on the lower ring is generally in the order of five or six times the amount of wear on the upper ring such that the lower ring normally has a much shorter effective wear-life than the upper ring.

The above-indicated problem becomes even more significant when the top ring is of the design disclosed in U.S. Pat. No. 3,455,565, hereinafter referred to as a crescent ring, due to the fact that such a crescent ring effects a substantially improved seal which substantially decreases the fluid pressure along the cylinder wall below this ring. Thus, the unbalanced, net fluid pressure acting on the lower ring is further increased causing even greater wear on the lower ring. In addition, the absolute wear-life of such crescent rings has been extended many fold over that of prior art rings so that there is an even greater relative disparity between the extremely long wear-life of the upper crescent ring and the relatively short wear-life of the lower ring, the latter being the controlling factor in requiring piston disassembly for ring displacement.

OBJECTS AND SUMMARY OF THE INVENTION

Therefore, it is the principal object of the present invention to provide a novel design of a lower piston ring which, in terms of wear-life, is substantially more compatible with the improved sealing and wear-life properties of an upper crescent ring.

Simultaneously, it is also a principal object of the present invention to provide a novel combination of two piston rings which collectively provide substantially improved sealing properties over extended periods of wear-life.

In brief, the foregoing objects are achieved by the provision of an upper crescent ring which is characterized by radially overlapping ends forming a sealed arcuate interface and being composed of relatively soft, resilient material in combination with a lower ring comprising individual, arcuate segments composed of extremely hard, nonresilient material wherein the individual segments are set into an annular carrier ring which is composed of relatively soft, resilient, elastomeric material.

DETAILED DESCRIPTION

Figure 3:
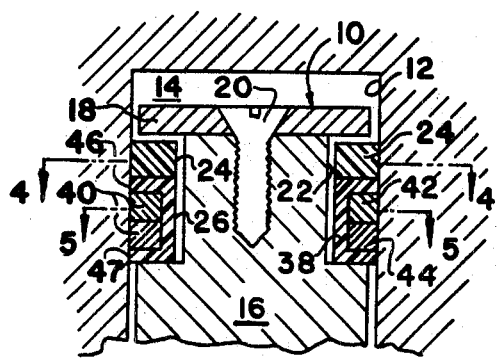
FIG. 3 is a sectional view of a piston and cylinder assembly incorporating upper and lower rings designed in accordance with the principles of the present invention.

Referring first to FIG. 3, numeral 10 indicates a piston assembly mounted for reciprocation in a cylinder 12 which collectively defines a working chamber 14. For purposes of illustration, chamber 14 may be considered to be a gas compression or expansion chamber wherein a gas, such as helium or hydrogen, is compressed or expanded as, for example, in cryogenic refrigeration cycles such as those described in U.S. Pat. Nos. 3,205,679 and 3,199,304. While not limited to such use, it is to be understood that the rings of the present invention find particular application in miniaturized compression equipment of this type wherein the absolutely dry, pure gas to be compressed must retain its purity and, hence, conventional oil-lubricated rings cannot be used.

Still referring to FIG. 3, piston 10 is composed of a main body portion 16 and a removable top portion 18 which may be rigidly secured together by any suitable means such as machine screw 20. The upper end of main body portion 16 is formed with a reduced diameter such that a piston ring groove 22 is formed upon the assembly of the two piston portions. Alternatively, it will be apparent that groove 22 may be formed in top portion 18 or it may be formed partially in each of the piston portions. In the illustrated embodiment, groove 22 is made of sufficient axial length to accommodate an upper ring 24 and a lower ring assembly 26 while also providing a clearance space between the bottom of piston portion 18 and upper ring 24. Thus, high-pressure fluid from chamber 14 can flow through this clearance space into an annular chamber formed by groove 22 radially behind ring 24 and ring assembly 26. Alternatively, it is apparent that separate grooves could be provided and other forms of passages so as to admit high-pressure fluid from the working chamber radially behind the rings.

Figure 4:
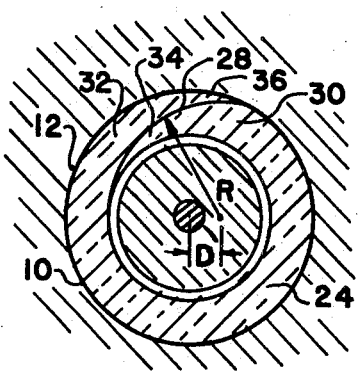
FIG. 4 is a sectional view of the upper, crescent ring taken along the plane indicated by view line 4–4 of FIG. 3.

As shown most clearly in FIG. 4, upper ring 24 is a split ring preferably of the crescent type more fully disclosed in U.S. Pat. Nos. 3,373,999 and 3,455,565. In general, this ring is characterized by the provision of an arcuate joint or interface 28 formed by overlapping ends 30 and 32 which terminate in thinner, highly flexible tip portions 34 and 36, respectively. These overlapping ends and flexible tip portions continuously provide a sealed, arcuate interface 28 both initially and as the periphery of the ring wears. That is, as peripheral wear occurs, the ring radially expands due to the fluid pressure in groove 22 and the overlapping ends and tip portions moving circumferentially in opposite directions while maintaining the sealed interface 28 by reason of the fluid pressure acting on the radially inner end and tip portion.

As further described in the above-referenced patents, the radius of curvature R is preferably selected so as to be greater than the internal radius of the ring but less than the external diameter of the ring. Furthermore, it has been found that the center of revolution of radius R should be positioned on a diameter of the ring at a point spaced from the center of the ring by a distance D which is less than one-half the internal ring diameter so that the taper of radially inner tip 34 is less than that of radially outer tip 36. As a result, the thicker tip portion 36, which is subject to frictional wear, provides maximum heat conduction away from the periphery while the thinner tip portion 34 is more deformable and therefore provides maximum sealing engagement against end 32. In addition, it has been discovered that, within the above criteria, maximum wear-life will result if the radius of curvature R is such that the radial thickness of tip portion 36 is in the order of two-thirds of the total radial thickness of the ring when measured at the midpoint of the arcuate interface.

With regard to the materials of construction for ring 24, it will be apparent that many materials are possible including metals, plastic, leather, and rubber. However, it will also be apparent that the choice of material must be related to the magnitude of the fluid biasing force employed to urge the ends and tips of the ring into firm sealing engagement with each other and with the cylinder wall. In this regard, it has been found that the use of polytetrafluoroethylene materials are particularly advantageous in the case of the miniaturized, dry gas compressors referred to hereinabove due to the fact that such materials have high deformability and low coefficients of friction which are essential to this particular application. In addition, such materials may be filled or impregnated with such materials as bronze powder, graphite, carbon and/or MoS₂ to achieve the best cold flow and dry lubricating properties.

Since this ring is of a split construction and is composed of the aforementioned resilient materials, ring 24 readily expands in the radial direction upon the application of fluid pressure to the internal surface of the ring. Thus, the ring quickly seats against the cylinder wall 14 as the fluid pressure in the working chamber begins to rise slightly as, for example, upon the beginning of a compression stroke in a pump or compressor. As a result, the fluid is immediately prevented from flowing past the upper ring and the trapped pressure quickly rises in groove 22 behind and above the rings such that an effective seal is immediately produced.

Figure 5:
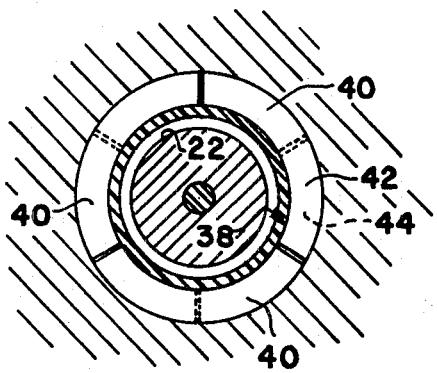
FIG. 5 is a sectional view of the lower, segmental ring taken along the plane indicated by view line 5–5 of FIG. 3.

Referring now to FIGS. 3 and 5, the lower ring assembly 26 includes an annular retainer ring 38 of channel-shaped cross section in which two sets of individual, arcuate segments 40 are set circumferentially adjacent each other so as to form composite rings 42 and 44, there being three arcuate segments per ring in the illustrated embodiment. Each of segments 40 is composed of very hard, rigid, long-wearing material such as, for example, pyrolytic graphite or tungsten carbide which, prior to the present invention, were considered much too rigid and brittle to be used in an expandable ring. That is, these materials were thought to have much too high a modulus of elasticity and/or too little ductility to be used in expandable ring. However, in accordance with the present invention, such materials have been found to be usable in expandable rings by making relatively short segments and then holding the segments by an expandable, elastomeric carrier ring 38 which, for example, may be composed of plastic materials such as plain or filled polytetrafluoroethylene or synthetic rubber, or other deformable materials which will expand upon application of the internal fluid pressure. Thus, when high-pressure fluid is admitted behind the ring assembly 26, the carrier ring 38 expands forcing each segment radially outwardly into very effective sealing engagement with the cylinder wall as shown in FIG. 5. Of course, radial outward movement of the segments causes slight gaps to form between each adjacent pair of segments although the gaps are greatly exaggerated in FIG. 5. However, by providing two or more rings 42 and 44 with the joints circumferentially staggered, essentially no fluid flow can pass through the ring assembly. The high fluid pressure radially behind the carrier ring, and on top of the upper ring, maintains the carrier ring in sealed engagement with the arcuate segments. In addition, the upper and lower annular lips 46, 47 of the carrier ring act as additional sealing surfaces adding to the total sealing effect along the cylinder wall, and lower lip 47 also seals against the bottom of groove 22 trapping the fluid therein behind the assembly. Furthermore, lips 46 and 47 can be employed to continuously apply a dry film lubricant to the cylinder wall when carrier ring 38 is impregnated with a dry film lubricant such as molybdenum disulfide. In addition, it has been found that the preferred material for carrier ring 38 is carbon-filled polytetrafluoroethylene and, more specifically, a composition of 64 to 69 percent by weight of polytetrafluoroethylene, 30 to 34 percent by weight of carbon, and 1 to 2 percent by weight of graphite.

Figure 1:
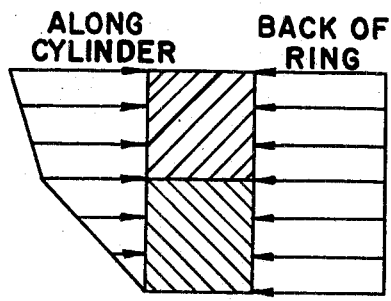
FIG. 1 is a vector diagram illustrating the fluid pressures acting upon upper and lower piston rings in a piston and cylinder assembly.
Figure 2:
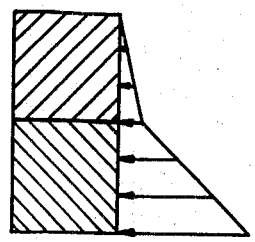
FIG. 2 is a vector diagram illustrating the net fluid pressures acting radially outwardly on the two rings.

From the foregoing description, it will be apparent that the upper crescent ring 24 provides the first highly effective fluid seal which decreases the pressure along the cylinder wall as illustrated in FIG. 1 and, because of the arcuate interface between the radially overlapping and tip portions, this ring is capable of undergoing a great amount of peripheral wear without opening any gap. That is, the arcuate joint 28 remains closed and the ring continues to maintain a quick-acting and tight seal until the peripheral wear is so great that the tips have moved circumferentially away from each other to the extent that they are no longer radially overlapping. As a result, the upper ring has an extremely long effective sealing life and the high degree of sealing effected by this ring creates a large net fluid biasing force acting on the lower ring which expands the lower ring into very effective sealing engagement with the cylinder wall. Whereas, such forceful engagement of the lower ring against the wall would normally shorten the wear-life of the lower ring, the present invention enables the use of extremely hard, long-wearing materials such as tungsten carbide, pyrolytic graphite, or impregnated carbon which would otherwise be too brittle to be used in expandable rings. Thus, the wear-life of the lower ring can be extended so as to match the extended wear-life of the upper ring. For example, the above-described combination of rings has been tested in the previously mentioned dry gas compressors and found to have substantially surpassed all other known rings in terms of absolute sealing ability while, at the same time, having a wear-life which is in the order of five times that of any known rings. Accordingly, it will be apparent that the present invention accomplishes all of the initially stated objects of the invention and, since numerous variants will be apparent to those skilled in the art, it is to be understood that the foregoing description is intended to be merely illustrative of the invention which is not to be limited other than as set forth in the following claims.

We claim:

1. A piston assembly including a piston having a groove; a piston ring assembly in said groove; fluid passage means for supplying pressurized fluid to said groove radially behind said ring assembly, said assembly including a carrier ring of channel-shaped cross section, at least one set of arcuate segments in said carrier ring forming at least one composite ring, said carrier ring being composed of resilient, expandable material, and said segments being composed of hard, nonexpandable, long-wearing material.

2. The piston assembly as claimed in claim 1 wherein said carrier ring is primarily composed of polytetrafluoroethylene.

3. The piston assembly as claimed in claim 1 wherein said segments are composed of material taken from the group comprising tungsten carbide, pyrolytic graphite, and impregnated carbon.

4. The piston assembly as claimed in claim 1 wherein said carrier ring is composed of an elastomeric plastic impregnated with a dry film lubricant and said segments are composed of material taken from the group comprising tungsten carbide, pyrolytic graphite, and impregnated carbon.

5. In combination, means forming a first readily expandable piston ring providing a quick-acting seal, a second expandable ring comprising an integral nonsplit carrier ring, said carrier ring being composed of expandable material, a plurality of individual arcuate ring segments held circumferentially adjacent each other by said carrier ring so as to form a composite segmental ring, said segments being composed of a hard, brittle, long-wearing material.

6. The combination as claimed in claim 5 wherein said first ring is composed of readily deformable and expandable material.

7. The combination of rings as claimed in claim 5 wherein said first ring is a split ring having end portions forming a sealed interface.

8. The combination of rings as claimed in claim 7 wherein said first ring is a split ring having circumferentially overlapping end portions forming a sealed arcuate interface.

9. The combination of rings as claimed in claim 5 wherein said carrier ring partially surrounds said ring segments and includes at least one lip portion forming an additional sealing ring surface.

10. The combination of rings as claimed in claim 9 wherein said lip portion includes a dry film lubricant.

11. The combination of rings as claimed in claim 5 wherein said carrier ring is composed of a relatively soft, elastomeric material.

12. The combination of rings as claimed in claim 5 wherein said segments are composed of material taken from the group comprising tungsten carbide, pyrolytic graphite, and impregnated carbon.